May 24, 1949.  W. R. GOSS  2,471,151
ADJUSTABLE SPEED DYNAMOELECTRIC MACHINE
Filed Aug. 20, 1948
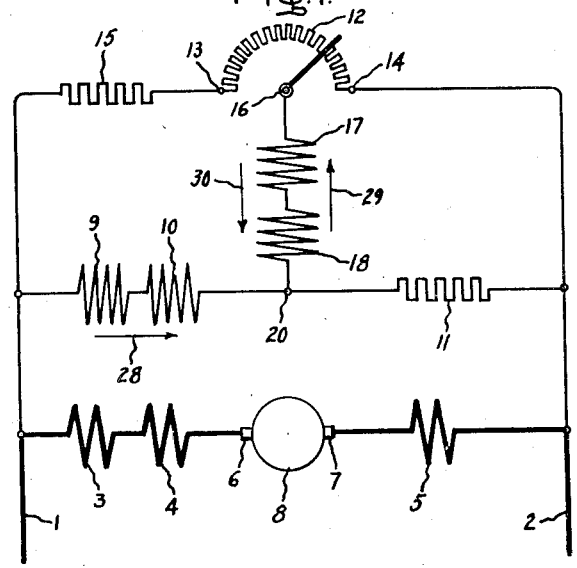
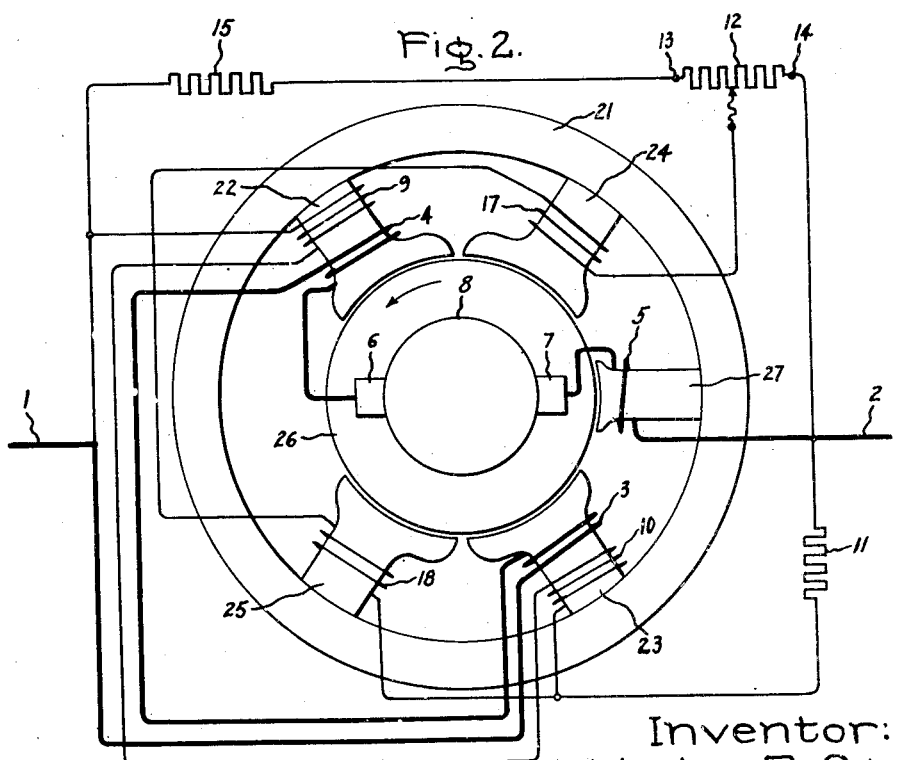
Inventor:
Wesley R. Goss,
by Prowell A. Mack
His Attorney.

Patented May 24, 1949

2,471,151

UNITED STATES PATENT OFFICE 2,471,151

ADJUSTABLE SPEED DYNAMOELECTRIC MACHINE

Wesley R. Goss, Fort Wayne, Ind., assignor to General Electric Company, a corporation of New York Application August 20, 1948, Serial No. 45,304

17 Claims. (Cl. 318—425)

This invention relates to commutating type dynamo-electric machines and more particularly to direct current motors having divided poles with a plurality of field exciting windings respectively positioned on the two segments of each pole and means for reversing the polarity of one segment of each pole for adjusting the speed.

In the design of commutating type motors, it is desirable to provide simple means for accurately adjusting the speed over a wide range in as small increments as possible and in addition to provide the requisite stability at the speed selected.

An object of this invention is to provide improved means for adjusting the speed of a commutating type motor.

Another object of this invention is to provide an improved field exciting arrangement for direct current motors whereby the speed may be accurately adjusted.

A further object of the invention is to provide an improved field exciting arrangement for direct current dynamoelectric machines.

Further objects and advantages of this invention will become apparent and the invention will be better understood by reference to the accompanying description and drawing. The features of novelty which characterize this invention will be pointed out with particularity in the claims annexed to and forming a part of this specification.

A feature of this invention is the provision of a commutating type direct current motor having two main polar projections, each polar projection being divided into two portions. A series compensating winding is wound on one portion of each polar projection and a shunt field exciting winding is also wound on the same portions. A second field exciting winding is wound on the other portion of each polar projection and is adapted to be excited through a potentiometer and bridge circuit so that the current therethrough can be varied from a maximum in one direction through zero to a maximum in the other direction. With this divided main pole arrangement, the polarity of half of each main pole can be reversed to increase the speed and the other half is compensated by armature current to improve stability.

In the drawing, Fig. 1 is a schematic circuit diagram illustrating the improved speed adjustment and compensating arrangement of this invention; and Fig. 2 illustrates schematically the physical arrangement of the various windings on the polar projections of the machine.

Referring to Fig. 1, there is shown schematically the circuit arrangement of this invention applied to a commutating type direct current motor which is adapted to be excited from an external source of power by lines 1 and 2. The motor is provided with an armature circuit including series compensating field exciting windings 3 and 4 and an interpole winding 5 arranged in series with the armature through brushes 6 and 7 which contact a commutator shown schematically as 8. A shunt field circuit is arranged across the lines 1 and 2 in parallel with the armature circuit and includes shunt field exciting windings 9 and 10 and a fixed resistor 11 in series with the shunt field exciting windings. A potentiometer 12 is arranged with its end terminals 13 and 14 in parallel with the armature circuit, a second fixed resistor 15 being interposed in series with end terminal 13 and line 1 on the side of the potentiometer adjacent the shunt field exciting windings 9 and 10, terminal 14 being connected directly to line 2. The potentiometer 12 is provided with a movable center terminal 16 which is connected to one terminal of a second field exciting winding 17 and 18, the other terminal of this winding being connected between the shunt field exciting windings 9 and 10 and the resistor 11 at 20. It can be readily seen that the shunt field circuit, potentiometer circuit, and the second field exciting winding constitute a bridge arrangement, the functioning of which will be hereinafter described.

Referring now to Fig. 2, there is shown a commutating type direct current motor having a stationary field structure including a yoke portion 21 and two pairs of polar projections 22, 23, and 24, 25. The polar projections 22, 24, and 23, 25 constitute a pair of main polar projections, each pair being respectively divided into two portions or segments. The series compensating field exciting windings 3 and 4 are positioned on polar projections or portions 22 and 23 and are arranged in series with brushes 6 and 7 and interpole winding 5, which is positioned on interpole 27. The shunt field exciting windings 9 and 10 are also positioned on polar projections or portions 22 and 23, while the second field exciting windings 17 and 18 are positioned on polar projections or portions 24 and 25. The motor is provided with an armature 26 of any desired type. It can now be readily seen that there is here provided a commutating type direct current motor having two divided main poles, the series compensating and shunt field exciting windings being positioned on one half of each pole and the second field exciting winding being positioned on the other half of each pole.

In operation, assuming the movable center terminal 16 of potentiometer 12 to be turned to the full clockwise position, i. e., connected to end terminal 14, the current flowing through the shunt field exciting windings 9 and 10 will be divided between the fixed resistor 11 and the field exciting windings 17 and 18. Assuming a direction of current flow through windings 9 and 10 as shown by the arrow 28, the direction of current flow through field exciting windings 17 and 18 will be in the direction as shown by the arrow 29. With this arrangement, the field exciting windings 9, 10, and 17, 18 will be accumulative and the excitation produced thereby will be maximum thus producing the lowest speed. A sufficient number of turns is provided on the series compensating field exciting windings 3 and 4 to provide adequate compensation for the armature reaction. By changing the position of the center terminal 16 of potentiometer 12 in a counterclockwise direction, the speed of the motor will be caused to rise. The current flow 28 through shunt field exciting windings 9 and 10 will be reduced due to the increased effective resistance in series therewith, i. e., since a portion of the potentiometer 12 is now in series with the field exciting windings 17 and 18 in parallel with fixed resistor 11. As the movable center terminal 16 is moved further counterclockwise, a point will be reached at which the resistance in the potentiometer in series with the windings 17 and 18 is equal to the resistance of resistor 11 and, at this point, since the voltage drops in the potentiometer circuit on either side of the movable contact 16 will be equal, the current in the windings 17 and 18 will cease to flow. Thus, at this point, the motor will be operating with shunt field exciting windings 9 and 10 only partially excited and the windings 17 and 18 unexcited. Due to the armature reaction in the armature 26, there will still be some flux drawn from the poles 24 and 25 so that the excitation will not be as low as would initially appear. The point at which the transition from the windings 17 and 18 providing excitation to zero excitation depends on the designed proportions of the resistance of the potentiometer 12 and the resistance of fixed resistor 11. Further counterclockwise movement of the movable center terminal 16 of potentiometer 12 causes the current in windings 17 and 18 to reverse and flow in the direction indicated by the arrow 30. This increases the current flow through the fixed resistor 11 and thus raises the voltage drop across this resistor further reducing the current flowing through the shunt field exciting windings 9 and 10. Thus, as the movable center terminal 16 is moved counterclockwise, the strength of the polar portions 22 and 23 is reduced and the polarity of portions 24 and 25 is reversed further decreasing the generated voltage of the motor and increasing the speed. The fixed resistor 15 in series with the end terminal 13 of potentiometer 12 is provided to prevent reaching a point of zero excitation when the movable center terminal 16 is at end terminal 13, which would be the case in the event that the shunt field exciting windings 9 and 10 were identical to the windings 17 and 18. Full stability is maintained with this arrangement since any increase in armature current is reflected in a proportional increase in field flux produced by polar portions 22 and 23 which produces enough additional generated voltage to keep the current from rising an undesirable amount.

It can now be readily seen that there is here provided a field circuit arrangement in which the current in one of the windings can be changed from a maximum in one direction through zero to a maximum in the other direction. By the provision of the divided main poles with the shunt exciting and reversible current windings respectively positioned on the two portions, the polarity of one portion may be reversed for accurate speed adjustment while the stability is maintained.

While this invention has been described above as utilized with a direct current motor, it will be readily seen that it is equally applicable to a direct current generator. The only change necessary to convert the circuit of Fig. 2 from a motor to a generator is to reverse the direction of rotation so that the compensated poles 22 and 23 are leading and the uncompensated poles 24 and 25 are trailing, this change being necessitated by the fact that the direction of current flow in a generator is reversed from the direction of flow in a motor. This arrangement is particularly suited for a generator which must be operated at different speeds.

While there is illustrated and described a specific embodiment of this invention, further modifications and embodiments will occur to those skilled in the art. It is desired that it be understood, therefore, that this invention is not to be limited to the specific embodiments shown, and it is intended in the appended claims to cover all modifications which do not depart from the spirit and scope of this invention.

What I claim as new and desire to secure by Letters Patent of the United States is:

1. In a commutator type direct current motor having an armature circuit and a field structure, a shunt field circuit arranged in parallel with said armature circuit and including a shunt field exciting winding and a resistor in series therewith, a second field exciting winding having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor.

2. In a commutator type direct current motor having an armature circuit and a field structure, a series compensating field exciting winding in said armature circuit, a shunt field circuit arranged in parallel with said armature circuit and including a shunt field exciting winding associated with said series field exciting winding and a resistor in series with said shunt field exciting winding, a second field exciting winding, having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor.

3. In a commutator type direct current motor having an armature circuit and a field structure, a shunt field circuit arranged in parallel with said armature circuit and including a shunt field exciting winding and a resistor in series therewith, a second field exciting winding having one terminal connected between said shunt field exciting winding and said resistor, a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor, and a second resistor arranged in series with the end terminal of said potentiometer which is adjacent said shunt field exciting winding.

4. In a commutator type direct current motor having an armature circuit and a field structure, a series compensating field exciting winding in said armature circuit, a shunt field circuit arranged in parallel with said armature circuit and including a shunt field exciting winding associated with said shunt field exciting winding and a resistor in series with said shunt field exciting winding, a second field exciting winding having one terminal connected between said shunt field exciting winding and said resistor, a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor, and a second resistor arranged in series with the end terminal of said potentiometer which is adjacent said shunt field exciting winding.

5. In a commutator type direct current motor having an armature circuit and a field structure including two pairs of polar projections, a shunt field circuit arranged in parallel with said armature circuit and including a shunt field exciting winding positioned on one pair of said polar projections and a resistor in series with said shunt field exciting winding, a second field exciting winding positioned on the other pair of said polar projections and having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor.

6. In a commutator type direct current motor having an armature circuit and a field structure including two pairs of polar projections, a shunt field circuit arranged in parallel with said armature circuit and including a shunt field exciting winding positioned on one pair of said polar projections and a resistor in series therewith, a second field exciting winding positioned on the other pair of said polar projections and having one terminal connected between said shunt field exciting winding and said resistor, a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor, and a second resistor arranged in series with the end terminal of said potentiometer which is adjacent said shunt field exciting winding.

7. In a commutator type direct current motor having an armature circuit and a field structure including two pairs of polar projections, a series compensating field exciting winding positioned on one pair of said polar projections and arranged in series in said armature circuit, a shunt field circuit arranged in parallel with said armature circuit and including a shunt field exciting winding positioned on said one pair of said polar projections and a resistor in series with said shunt field exciting winding, a second field exciting winding positioned on the other pair of said polar projections and having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor.

8. In a commutator type direct current motor having an armature circuit and a field structure including two pairs of polar projections, a series compensating field exciting winding positioned on one pair of said polar projections and arranged in series in said armature circuit, a shunt field circuit arranged in parallel with said armature circuit and including a shunt field exciting winding positioned on said one pair of said polar projections and a resistor in series with said shunt field exciting winding, a second field exciting winding positioned on the other pair of said polar projections and having one terminal connected between said shunt field exciting winding and said resistor, a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor, and a second resistor arranged in series with the end terminal of said potentiometer which is adjacent said shunt field exciting winding.

9. In a commutator type dynamoelectric machine having an armature circuit and a field structure, a shunt field circuit arranged in parallel with said armature circuit and including a shunt field exciting winding and a resistor in series therewith, a second field exciting winding having one terminal connected between said shunt field exciting winding and said resistor, and means in parallel with said shunt field circuit and connected to the other terminal of said second field exciting winding for varying the current flow in said second field exciting winding from a maximum in one direction through zero to a maximum in the other direction.

10. In a commutator type direct current motor having an armature circuit, a pair of main polar projections, each of said polar projections being divided into two portions, a shunt field circuit arranged in parallel with said armature circuit and including a shunt field exciting winding positioned on one portion of each of said polar projections and a resistor in series with said shunt field exciting winding, a second field exciting winding positioned on the other portion of each of said polar projections and having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor.

11. In a commutator type direct current motor having an armature circuit, a pair of main polar projections, each of said polar projections being divided into two portions, a series compensating field exciting winding positioned on one portion of each of said polar projections and arranged in series with said armature circuit, a shunt field circuit arranged in parallel with said armature circuit and including a shunt field exciting winding positioned on said one portion of each of said polar projections and a resistor in series with said shunt field exciting winding, a second field exciting winding positioned on the other portion of each of said polar projections and having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor.

12. In a commutator type direct current motor having an armature circuit, a pair of main polar projections, each of said polar projections being divided into two portions, a shunt field circuit arranged in parallel with said armature circuit and including a shunt field exciting winding positioned on one portion of each of said polar projections and a resistor in series with said shunt field exciting winding, a second field exciting winding positioned on the other portion of each of said polar projections and having one terminal connected between said shunt field exciting winding and said resistor, a potentiometer having its two end terminals connected in parallel with said shunt field circuit and a variable center terminal connected to the other terminal of said second field exciting winding, whereby the current flow in said second field exciting winding can be varied from a maximum in one direction through zero to a maximum in the other direction for adjusting the speed of said motor, and a second resistor arranged in series with the end terminal with said potentiometer which is adjacent said shunt field exciting winding.

13. In a commutator type direct current motor having an armature circuit, a pair of polar projections, each of said polar projections being divided into two portions, a series compensating field exciting winding positioned on one portion of each of said polar projections and arranged in series with said armature circuit, a shunt field circuit arranged in parallel with said armature circuit and including a shunt field exciting winding positioned on said one portion of each of said polar projections and a resistor in series with said shunt field exciting winding, a second field exciting winding positioned on the other portion of each of said polar projections and having one terminal connected between said shunt field exciting winding and said resistor, a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction for adjusting the speed of said motor, and a second resistor arranged in series with the end terminal with said potentiometer which is adjacent said shunt field exciting winding.

14. In a commutator type direct current dynamo-electric machine having an armature circuit and a field structure, a series compensating field exciting winding in said armature circuit, a shunt field circuit arranged in parallel with said armature circuit and including a shunt field exciting winding associated with said series field exciting winding and a resistor in series with said shunt field exciting winding, a second field exciting winding having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction.

15. In a commutator type direct current dynamo-electric machine having an armature circuit and a field structure including two pairs of polar projections, a shunt field circuit arranged in parallel with said armature circuit and including a shunt exciting winding positioned on one pair of said polar projections and a resistor in series with said shunt field exciting winding, a second field exciting winding positioned on the other pair of said polar projections and having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction.

16. In a commutator type direct current dynamo-electric machine having an armature circuit and a field structure including two pairs of polar projections, a series compensating field exciting winding positioned on one pair of said polar projections and arranged in series in said armature circuit, a shunt field circuit arranged in parallel with said armature circuit and including a shunt field exciting winding positioned on said one pair of said polar projections and a resistor in series with said shunt field exciting winding, a second field exciting winding positioned on the other pair of said polar projections and having one terminal connected between said shunt field exciting winding and said resistor, and a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction.

17. In a commutator type direct current dynamo-electric machine having an armature circuit, a pair of polar projections, each of said polar projections being divided into two portions, a series compensating field exciting winding positioned on one portion of each of said polar projections and arranged in series with said armature circuit, a shunt field circuit arranged in parallel with said armature circuit and including a shunt field exciting winding positioned on said one portion of each of said polar projections and a resistor in series with said shunt field exciting winding, a second field exciting winding positioned on the other portion of each of said polar projections and having one terminal connected between said shunt field exciting winding and said resistor, a potentiometer having its two end terminals connected in parallel with said shunt field circuit and a variable center terminal connected to the other terminal of said second field exciting winding whereby the current flow in said second field exciting winding can be varied from a maximum in one direction through zero to a maximum in the other direction, and a second resistor arranged in series with the end terminal with said potentiometer which is adjacent said shunt field exciting winding.

WESLEY R. GOSS.

No references cited.